Patented Mar. 7, 1939

2,150,138

UNITED STATES PATENT OFFICE

2,150,138

PROCESS FOR REFINING ROSIN

Byron M. Vanderbilt, Terre Haute, Ind., assignor to Commercial Solvents Corporation, Terre Haute, Ind., a corporation of Maryland No Drawing. Application June 14, 1937,
Serial No. 148,111

17 Claims. (Cl. 260—107)

My invention comprises an improved process for refining rosin, and more particularly, for removing coloring matter from wood rosin.

Wood rosin is known to comprise essentially abietic acid with minor amounts of impurities such as color bodies, other resins, etc. The lower grades of rosin in particular contain substantial amounts of two classes of color bodies. One of these imparts color to the initial rosin, while the other is of the latent type which tends to produce color upon aging, particularly in the presence of oxygen and when reacted with alkalies. The removal of the first type of color bodies from rosin has been found to be possible by distillation, but elimination of the latter type has been found to be much more difficult. Although the latent color bodies are generally present in relatively small proportions in certain low grades of gum rosin and generally in wood rosin, the difficulty of their complete removal by most previous processes has constituted a serious disadvantage from the standpoint of utilizing such rosins in soaps, limed varnishes, paper sizes, or the like. Similarly, the color bodies which impart initial color to the rosin decrease their value for many industrial purposes.

As indicated above, partial purification of wood rosin may be effected by distillation, but even repeated distillation fails to satisfactorily remove the latent coloring material. Further efforts to satisfactorily remove substantially all of both types of color bodies have included solvent extraction. Such processes have included treating a solution of the rosin in an organic solvent with a selective solvent for the color bodies. Although a number of such solvents and solvent combinations have previously been suggested, they have in general been unsuited from one standpoint or another, and up to the present time there has not been available a single type of solvent having all of the desired properties for the satisfactory commercial purification of wood rosin.

I have now discovered that the nitroalcohols containing less than six carbon atoms are particularly advantageous solvents for the extraction of color bodies from the low grade rosins. These compounds have an excellent selective solvent power for the color bodies, are chemically stable and are easily recoverable from the extracted material. These compounds, and particularly 2-nitropropanol, the nitrobutanols and the nitropentanols are especially advantageous both with respect to their solubility characteristics for the undesirable constituents of wood rosin and their immiscibility with petroleum hydrocarbon rosin solvents. Other advantages arising from the use of these compounds will be apparent from the following description.

In the practice of my invention, the rosin may first be subjected to any desired distillation process or other preliminary treatment, but such preliminary treatment is generally unnecessary and it is preferred, therefore, to omit it.

My process comprises, briefly, subjecting to the extractive action of a nitroalcohol a solution of rosin in a solvent capable of immiscibility with said nitroalcohol, cooling said mixture, if necessary, to effect separation of the nitroalcohol containing the color bodies of the rosin, and the recovery of the substantially color-improved rosin from the solution thereof. In a preferred modification of my process, a nitroalcohol and a rosin solvent are chosen which will be substantially miscible at the extraction temperature, and immiscible at a practically obtainable lower temperature. In this case, the rosin, rosin solvent and nitroalcohol are mixed, and heated, if necessary, to secure miscibility, then cooled with thorough agitation to a point substantially below the temperature of immiscibility, and the resulting liquid phases are then separated by decantation, or the like. Alternatively, the nitroalcohol and rosin solvent may be used which are substantially immiscible at the desired extraction temperature, in which case the extraction is effected in a two phase system with thorough agitation, and, preferably, utilizing the counter-current principle.

The rosin solvents which may be employed in my process may be any organic solvents for rosin which are chemically inert under the conditions of extraction, which are capable of immiscibility with the nitroalcohol employed, and which may readily be removed from the resulting solution of refined rosin. I have found that petroleum hydrocarbon fractions, such as gasoline and naphtha, are particularly suitable for this purpose, but any other solvent meeting the above requirements may be satisfactorily used.

The nitroalcohols which are suitable for use in my process include any of the members of this series, or mixtures thereof, which may be satisfactorily separated from the rosin solvent and removed from the resulting solution of color bodies. The selection of the particular nitroalcohol to be used depends upon such factors as the rosin to be refined, the degree of refining desired, the rosin solvent used, the refining and recovery equipment available, etc. It is particularly desirable to select the proper combination of nitroalcohol and rosin solvent which are immiscible at a reasonable temperature. The following table shows the degree of immiscibility obtained by heating equal volumes of the various nitroalcohols, respectively, and petroleum naphtha (100-115° C.)

Table I

| Nitroalcohol | Degree of immiscibility |
|---|---|
| 2-methyl-1-butanol | Completely immiscible at 90° C. |
| 3-nitro-2-butanol | Completely immiscible at 90° C. |
| 3-methyl-2-nitro-1-butanol | Partially soluble at 90° C. |
| 2-nitro-1-pentanol | Miscible at 90° C. |
| 2-methyl-2-nitro-1-butanol | Miscible at 88° C. |
| 3-methyl-3-nitro-2-butanol | Miscible at 82° C. |
| 3-methyl-3-nitro-2-pentanol | Miscible at 52° C. |
| 2-nitro-3-hexanol | Miscible at 44° C. |
| 3-nitro-2-hexanol | Miscible at 39° C. |
| 3-nitro-4-heptanol | Miscible at 7° C. |
| 5-nitro-4-octanol | Miscible below 0° C. |

As rosin promotes the mutual solubility of nitroalcohols and naphtha, the nitroalcohols having six or more carbon atoms are therefore less desirable for use in connection with petroleum naphtha as a rosin solvent unless some other material is incorporated therewith to reduce the miscibility of the nitroalcohol and petroleum naphtha or unless good refrigeration is employed. It should be noted also that the temperature and degree of immiscibility of the nitroalcohol varies with different rosin solvents.

In carrying out my process, the proportion of solvents and the concentration of rosin in the solvent mixture will be largely a matter of choice, depending on economical factors. I prefer, in general, however, to employ solvents of an approximate ratio of 1.4 parts of nitroalcohol and 6.1 parts rosin solvent, per 1 part of rosin, but it is obvious that these proportions may be varied through a relatively wide range. By increasing the proportion of rosin solvent a larger number of separate extractions is generaly required, but a better yield of a refined rosin is obtained. By increasing the proportion of nitroalcohol a better grade of a refined rosin is obtained, but at the cost of a decreased yield of such refined rosin. By increasing the amounts of both nitroalcohol and rosin solvent, relative to the amount of rosin, an improved yield of a more highly refined rosin is obtained. It is thus apparent that economic considerations will primarily control the actual proportions utilized for any given extraction.

The temperatures employed for the extraction and separation in the operation of my process will depend upon the particular solvents chosen. As previously pointed out, the extraction is preferably effected by heating to the point of miscibility and then cooling with agitation to secure immiscibility. However, where good agitation is employed complete miscibility of the nitroalcohol and rosin solvent is not essential and the extraction may be effected in a two phase rather than a homogeneous system. It should be noted, however, that the nitroalcohol and rosin solvent may be heated to a temperature considerably above the miscibility point as long as no losses are encountered due to decomposition, vapor losses, or the like. The separation of the two phases after extraction should be effected at the temperature giving optimum distribution of the refined rosin and color bodies. I have found that, in general, however, cooling to approximately room temperature, i. e., 15° C.–25° C., is satisfactory in most instances, but in any case preliminary experiments will readily determine the optimum temperature of separation. Likewise, in the case of extractions carried out entirely in a two-phase system, a temperature should be chosen which will give the optimum selective solvent action.

My invention will be illustrated by the following specific procedure: A mixture of 30 parts of FF wood rosin, 184 parts of petroleum naphtha (boiling range 100–115° C.), and 22 parts of nitroalcohol was vigorously agitated in a reaction kettle and heated until the point of miscibility was reached. In cases where the temperature of miscibility was in excess of 70° C. the mixture was preferably heated only to the latter temperature and vigorously agitated at this temperature for 5–10 minutes. In either case, the contents of the kettle were cooled slowly with good agitation to room temperature or lower. At this point agitation was stopped and the material allowed to separate into two layers, which were then separated in the usual manner. The upper layer comprised a light colored solution of the refined rosin in naphtha, while the lower layer was an extremely dark colored solution of the color bodies in the nitroalcohol. The upper naphtha layer was then again similarly treated with an additional 22 parts of nitroalcohol, and separation of the two layers effected as before, the two nitroalcohol layers being combined at the conclusion of the operation. The solvents were then removed from both solutions by first heating to 100° C. at 200 mm. and finally to 150° C. at 5 mm., and finally steam distilled at this latter temperature and pressure until the last of the solvent had been driven out of the rosin.

The properties of the refined rosin obtained using petroleum naphtha and various nitroalcohols are shown in Table II, below.

Table II

| Extractant | Miscibility temp., °C. | | Layer of separation temp., °C. | Refined rosin obtained, percent | Acid number | | | Lovibond red of— | |
|---|---|---|---|---|---|---|---|---|---|
| | First extraction | Second extraction | | | Crude rosin | Refined rosin | Extracted rosin | Crude rosin | Refined rosin |
| 2-methyl-2-nitro-1-butanol | 58 | 52 | 18 | | 149.3 | 159.5 | 132 | 20.0 | 5.0 |
| 2-nitro-1-propanol | 70* | 70* | 25 | 77 | 149.3 | 159.5 | 128 | 20.0 | 6.0 |
| 2-nitro-3-hexanol | 28 | 16 | 0 | 71 | 149.3 | 159.5 | 145 | 32.0 | 12.3 |
| 2-methyl-2-nitro-1-butanol | 54 | 49 | 20 | 70 | 149.3 | 161 | 129.5 | 32.0 | 5.5 |
| 3-methyl-3-nitro-2-butanol | 50 | 46 | 12 | 73 | 149.3 | 161.5 | 149 | 32.0 | 5.3 |
| 3-nitro-2-butanol | 75* | 81 | 20 | 77 | 149.3 | 163 | 121 | 32.0 | 6.0 |

* Immiscible.

It will be seen from the above examples that a high degree of purification is effected by the process of the present invention. The degree of purification obtainable is limited solely by the number of extractions made and the proportion of solvents employed. Thus, by repeating the extractions of the above examples, a more refined grade of rosin is obtainable, whereas, by using only one extraction a lesser degree of refining is obtained than with the amount of nitroalcohol and two extractions used in the procedure outlined in the specific example given above. It is obvious, therefore, that the degree of purification secured will be limited only by economic considerations. In general, it may be said that a two-stage extraction, or at most a three-stage extraction, will give a product of sufficiently improved characteristics to warrant the expense involved.

It will be apparent that the procedure of the above example may be modified in numerous respects. For example, other nitroalcohols and other rosin solvents may suitably be employed. Likewise, various mixtures of nitroalcohols may be substituted for the particular compounds shown in the above example. As has previously been pointed out, any combination of nitroalcohols and rosin solvents may be employed so long as immiscibility is obtainable under practical operating conditions. The temperatures may be varied to suit the requirements of the particular solvent, and any suitable type of apparatus may be utilized. Numerous modifications of procedure, such as the use of a two-phase counter-current extraction, will be apparent to those skilled in the art. In general, it may be said that the use of any such modification, and the use of any equivalents which would naturally occur to those skilled in the art, are included within the scope of my invention.

My invention now having been described, what I claim is:

1. In a process for the refining of rosin, the steps which comprise subjecting to the action of a nitroalcohol a solution of rosin in a solvent capable of immiscibility with said nitroalcohol, forming substantially immiscible liquid phases comprising a solution of rosin in the said rosin solvent, and a solution of rosin impurities in the said nitroalcohol, and separating the said liquid phases.

2. In a process for the refining of rosin, the steps which comprise subjecting a solution of rosin in a petroleum hydrocarbon solvent to the action of a nitroalcohol capable of immiscibility with said petroleum hydrocarbon solvent, forming substantially immiscible liquid phases comprising a solution of rosin in the said petroleum hydrocarbon and a solution of rosin impurities in the said nitroalcohol, and separating the said liquid phases.

3. In a process for the refining of rosin, the steps which comprise subjecting to the action of nitroalcohol having less than six carbon atoms a solution of rosin in a solvent capable of immiscibility with said nitroalcohol, forming substantially immiscible liquid phases comprising a solution of rosin in the said rosin solvents, and a solution of rosin impurities in the said nitroalcohol, and separating the said liquid phases.

4. In a process for the refining of rosin, the steps which comprise subjecting a solution of rosin in a petroleum hydrocarbon solvent to the action of a nitroalcohol having less than six carbon atoms capable of immiscibility with said petroleum hydrocarbon solvent, forming substantially immiscible liquid phases comprising a solution of rosin in the said petroleum hydrocarbon and a solution of rosin impurities in the said nitroalcohol, and separating the said liquid phases.

5. In a process for the refining of rosin, the step which comprises subjecting a solution of rosin in a petroleum hydrocarbon solvent to the action of 2-nitropropanol.

6. In a process for the refining of rosin, the step which comprises subjecting a solution of rosin in a petroleum hydrocarbon solvent to the action of a nitrobutanol.

7. In a process for the refining of rosin, the step which comprises subjecting a solution of rosin in a petroleum hydrocarbon solvent to the action of a nitropentanol.

8. In a process for the refining of rosin, the steps which comprise subjecting to the action of a mixture of nitroalcohols a solution of rosin in a petroleum hydrocarbon solvent capable of immiscibility with said nitroalcohol mixture, forming substantially immiscible liquid phases comprising a solution of rosin in the said petroleum hydrocarbon, and a solution of rosin impurities in the said nitroalcohol mixture, and separating the said liquid phases.

9. In a process for the refining of rosin, the steps which comprise dissolving rosin in a solvent capable of immiscibility with a nitroalcohol, subjecting said rosin-solution to extraction with a nitroalcohol, separating the nitroalcohol fraction from the rosin-solution, and recovering refined rosin from the said rosin-solution.

10. In a process for the refining of rosin, the steps which comprise dissolving rosin in a petroleum hydrocarbon solvent, subjecting said rosin-solution to extraction with a nitroalcohol, separating the nitroalcohol fraction from the rosin-petroleum hydrocarbon fraction, and recovering refined rosin from the said petroleum hydrocarbon fraction.

11. In a process for the refining of rosin, the steps which comprise dissolving rosin in a petroleum hydrocarbon solvent, subjecting said rosin-solution to extraction with a nitroalcohol having less than six carbon atoms, separating said nitroalcohol fraction from the rosin-petroleum hydrocarbon fraction, and recovering refined rosin from the said petroleum hydrocarbon fraction.

12. In a process for the refining of rosin, the steps which comprise mixing a nitroalcohol with a solution of rosin in a solvent capable of immiscibility with said nitroalcohol, heating said nitroalcohol to a temperature above the temperature of miscibility of said nitroalcohol and rosin solvent, cooling said mixture with agitation to a temperature at which the nitroalcohol and rosin solvent are substantially immiscible, separating the resulting liquid phases, and recovering the refined rosin from the rosin solvent phase.

13. In a process for the refining of rosin, the steps which comprise mixing a nitroalcohol with a solution of rosin in a solvent capable of immiscibility with said nitroalcohol, heating to approximately 75° C., cooling with agitation to secure immiscibility, separating the resulting liquid phases, and recovering the refined rosin from the rosin solvent phase.

14. In a process for the refining of rosin, the steps which comprise mixing a nitroalcohol having less than six carbon atoms with a solution of rosin in a petroleum hydrocarbon solvent capable of immiscibility with said nitroalcohol, heating said mixture to a temperature above the temperature of miscibility of said nitroalcohol and petroleum hydrocarbon solution, cooling with agitation to approximately room temperature to secure immiscibility, separating the resulting liquid phases, and recovering the refined rosin from the rosin solvent phase.

15. In a process for the refining of rosin, the steps which comprise mixing 2-nitropropanol with a solution of rosin in a petroleum hydrocarbon solvent capable of immiscibility with said 2-nitropropanol, heating said mixture to a temperature above the temperature of miscibility of said 2-nitropropanol and petroleum hydrocarbon solution, cooling with agitation to approximately room temperature to secure immiscibility, separating the resulting liquid phases, and recovering the refined rosin from the rosin solvent phase.

16. In a process for the refining of rosin, the steps which comprise mixing nitrobutanol with a solution of rosin in a petroleum hydrocarbon solvent capable of immiscibility with said nitrobutanol, heating said mixture to a temperature above the temperature of miscibility of said nitrobutanol and petroleum hydrocarbon solution, cooling with agitation to approximately room temperature to secure immiscibility, separating the resulting liquid phases, and recovering the refined rosin from the rosin solvent phase.

17. In a process for the refining of rosin, the steps which comprise mixing nitropentanol with a solution of rosin in a petroleum hydrocarbon solvent capable of immiscibility with said nitropentanol, heating said mixture to a temperature above the temperature of miscibility of said nitropentanol and petroleum hydrocarbon solution, cooling with agitation to approximately room temperature to secure immiscibility, separating the resulting liquid phases, and recovering the refined rosin from the rosin solvent phase.

BYRON M. VANDERBILT.